United States Patent
Al-Harbi et al.

(10) Patent No.: US 12,241,019 B2
(45) Date of Patent: Mar. 4, 2025

(54) GRAPHENE BASED MATERIAL FOR CORROSION INHIBITION

(71) Applicants: SAUDI ARABIAN OIL COMPANY, Dhahran (SA); KING FAHD UNIVERSITY OF PETROLEUM & MINERALS, Dhahran (SA)

(72) Inventors: Bader Ghazi Al-Harbi, Dammam (SA); Tawfik A. Saleh, Dhahran (SA); Norah A. Aljeaban, Al Khobar (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 18/045,980

(22) Filed: Oct. 12, 2022

(65) Prior Publication Data

US 2024/0124761 A1     Apr. 18, 2024

(51) Int. Cl.
*C01B 32/194* (2017.01)
*C01B 32/198* (2017.01)
(Continued)

(52) U.S. Cl.
CPC ............. *C09K 8/54* (2013.01); *C01B 32/194* (2017.08); *C01B 32/198* (2017.08); *C01B 32/23* (2017.08); *E21B 37/06* (2013.01); *C09K 2208/32* (2013.01)

(58) Field of Classification Search
CPC .... C09K 8/54; C09K 2208/32; C01B 32/194; C01B 32/23; C01B 32/198
See application file for complete search history.

(56) References Cited

U.S. PATENT DOCUMENTS 10,017,706 B1   7/2018  Loebick et al.
2017/0002262 A1* 1/2017  Recio, III ............. C08F 220/34
(Continued)

FOREIGN PATENT DOCUMENTS

CA      2862899 C    10/2016
CN    106906531 A     6/2017
(Continued)

OTHER PUBLICATIONS

Abdullahi, B. O., et al. "Facile fabrication of hydrophobic alkylamine intercalated graphene oxide as absorbent for highly effective oil-water separation." Journal of Molecular Liquids 325 (2021): 115057.*
(Continued)

*Primary Examiner* — Richard M Rump
(74) *Attorney, Agent, or Firm* — Osha Bergman Watanabe & Burton LLP

(57) ABSTRACT

A method includes preparing an alkyl-modified graphene oxide, injecting the modified graphene oxide into a well, and inhibiting acid-induced corrosion of a steel surface in the well with the modified graphene oxide. A composition includes an alkyl-modified graphene oxide having one or more alkyl functional group covalently bonded to a graphene core through an oxygen-containing linking group. A method of preparing modified graphene oxide includes mixing graphite powder with an oxidant to provide a mixture, adding the mixture to an acid solution including $H_2SO_4$, $H_3PO_4$, or a combination thereof to provide graphene oxide, and reacting the graphene oxide with an alkyl halide by nucleophilic substitution to provide the alkyl-modified graphene oxide.

5 Claims, 2 Drawing Sheets

(51) Int. Cl.
*C01B 32/23* (2017.01)
*C09K 8/54* (2006.01)
*E21B 37/06* (2006.01)

(56) References Cited

U.S. PATENT DOCUMENTS

2019/0048491 A1* 2/2019 Bai ..................... C08K 3/04
2019/0345345 A1 11/2019 Meng et al.

FOREIGN PATENT DOCUMENTS

| | | |
|---|---|---|
| CN | 110212138 A | 9/2019 |
| CN | 110444717 A | 11/2019 |
| CN | 110644027 A | 1/2020 |
| CN | 106957706 B | 2/2020 |
| KR | 102263741 B1 | 6/2021 |
| WO | 2009085015 A1 | 7/2009 |
| WO | 2019098462 A1 | 5/2019 |

OTHER PUBLICATIONS

Zhang, Ye-wei, et al. "Tribological behavior of octadecylamine functionalized graphene oxide modified oil for wire rope in mine hoist." Wear 494 (2022): 204273.*

"Hydraulic Fracturing: The Process" GWPC. < https://www.gwpc.org/topics/hydraulic-fracturing/hydraulic-fracturing-the-process/> Available Mar. 7, 2021. Accessed Apr. 22, 2024.*

Ansari, K. R., et al. "Surfactant modified graphene oxide as novel corrosion inhibitors for mild steels in acidic media." Inorganic Chemistry Communications 121 (2020): 108238.*

Liao, Kaili, et al. "Effects of surfactants on dispersibility of graphene oxide dispersion and their potential application for enhanced oil recovery." Journal of Petroleum Science and Engineering 213 (2022): 110372.*

Bourlinos, Athanasios B., et al., "Graphite Oxide: Chemical Reduction to Graphite and Surface Modification with Primary Aliphatic Amines and Amino Acids", Langmuir, American Chemical Society, vol. 19, 2003, pp. 6050-6055 (7 pages).

Chang, K.C., et al., "The effect of varying carboxylic-group content in reduced graphene oxides on the anticorrosive properties of PMMA/reduced graphene oxide composites", eXPRESS Polymer Letters, vol. 8, No. 12, 2014, pp. 908-919 (12 pages).

Emranuzzamen, T. Kumar, et al., "Synergistic effects of formaldehyde and alcoholic extract of plant leaves for protection of N80 steel in 15% HCl", Corrosion Engineering, Science and Technology, vol. 39, No. 4, 2004, pp. 327-332 (6 pages).

Frenier, W.W., et al., "a-Alkenyphenones—A New Class of Acid Corrosion Inhibitors", Corrosion Science, National Association of Corrosion Engineers, 1988, pp. 590-598 (9 pages).

Gupta, Rajeev Kumar, et al., "Pyridine-based functionalized graphene oxides as a new class of corrosion inhibitors for mild steel: an experimental and DFT approach", RSC Advances, Royal Society of Chemistry, vol. 7, 2017, pp. 39063-39074 (12 pages).

Hajian, Reza, et al., "Properties and Applications of Functionalized Graphene Oxide", Material Matters, vol. 14, No. 1, 2019 (17 pages).

Haruna, Kabiru and Tawfik A. Saleh, "N, N'-Bis-(2-aminoethyl)piperazine functionalized graphene oxide (NAEP-GO) as an effective green corrosion inhibitor for simulated acidizing environment", Journal of Environmental Chemical Engineering, Elsevier Ltd., vol. 9, No. 104967, 2021 (15 pages).

Haruna, Kabiru, et al., "Graphene oxide grafted with dopamine as an efficient corrosion inhibitor for oil well acidizing environments", Surfaces and Interfaces, ScienceDirect, Elsevier B.V., vol. 24, No. 101046, 2021 (12 pages).

Herrag, L., et al., "Effect of Diaminoalkane Derivatives on Steel Corrosion in HCL Media", Acta Chim. Slov., vol. 54, 2007 (5 pages).

Ikhe, Amol Bhairuba, et al., "Perfluorinated polysiloxane hybridized with graphene oxide for corrosion inhibition of AZ31 magnesium alloy", Corrosion Science, ScienceDirect, Elsevier Ltd., vol. 109, 2016, pp. 238-245 (8 pages).

Kirkland, N.T., et al., "Exploring graphene as a corrosion protection barrier", Corrosion Science, ScienceDirect, Elsevier Ltd., vol. 56, 2012, pp. 1-4 (4 pages).

Leary, Rowan and Aidan Westwood, "Carbonaceous nanomaterials for the enhancement of TiO2 photocatalysis", Carbon, ScienceDirect, Elsevier Ltd., vol. 49, 2011, pp. 741-772 (32 pages).

Liu, Jincheng, et al., "Self-assembling TiO2 nanorods on large graphene oxide sheets at two-phase interface and their anti-recombination in photocatalytic applications", Advanced Functional Materials, Wiley-VCH Verlag, vol. 20, 2010, pp. 4175-4181 (7 pages).

Mann, Charles A., et al., "Organic Inhibitors of Corrosion: Aliphatic Amines", Industrial and Engineering Chemistry, vol. 28, No. 2, Feb. 1936, pp. 159-163 (5 pages).

Mondal, Jayanta, et al., "Graphene Nanoplatelets Based Protective and Functionalizing Coating for Stainless Steel", Journal of Nanoscience and Nanotechnology, American Scientific Publishers, vol. 15, 2015, pp. 6747-6750 (4 pages).

Mondal, Jayanta, et al., "Protection and Functionalizing of Stainless Steel Surface by Graphene Oxide-Polypyrrole Composite Coating", J. Chem. Chem. Eng., vol. 8, 2014, pp. 786-793 (8 pages).

Palanivel, Vignesh, et al., "Effects of addition of corrosion inhibitors to silane films on the performance of AA2024-T3 in a 0.5 M NaCl solution", Progress in Organic Coatings, Elsevier B.V., vol. 53, 2005, pp. 153-168 (16 pages).

Prasai, Dhiraj, et al., "Graphene: Corrosion-Inhibiting Coating", ACSNANO, vol. 6, No. 2, 2012, pp. 1102-1108 (7 pages).

De Queiroz Baddini, Ana Luisa, et al., "Statistical analysis of a corrosion inhibitor family on three steel surfaces (duplex, super-13 and carbon) in hydrochloric acid solutions", Electrochimica, ScienceDirect, Elsevier Ltd., vol. 53, Jun. 2007, pp. 434-446 (13 pages).

Rajeev, P., et al., "Corrosion mitigation of the oil well steels using organic inhibitors—A review", Journal of Mater. Environ. Sci., JMES, vol. 3, No. 5, 2012, pp. 856-869 (14 pages).

Ramezanzadeh, B., et al., "Enhancement of barrier and corrosion protection performance of an epoxy coating through wet transfer of amino functionalized graphene oxide", Corrosion Science, 2015, https://dx.doi.org/10.1016/j.corsci.2015.11.033 (46 pages).

Saleh, Tawfik A., et al., "Octanoate grafted graphene as an effective inhibitor against oil well acidizing corrosion", Journal of Molecular Liquids, ScienceDirect, Elsevier B.V., vol. 325, No. 115060, 2021 (10 pages).

Sathiya Priya, A.R., et al., "Development of Novel Acidizing Inhibitors for Carbon Steel Corrosion in 15% Boiling Hydrochloric Acid", Corrosion, NACE International, vol. 64, No. 6, Jun. 2008, pp. 541-552 (12 pages).

Singh, D.D.N. and A.K. Dey, "Synergistic Effects of Inorganic and Organic Cations on Inhibitive Performance of Propargyl Alcohol on Steel Dissolution in Boiling Hydrochloric Acid Solution", Corrosion Engineering, NACE International, Jul. 1993, pp. 594-600 (7 pages).

Xhanari, Klodian, et al., "Corrosion inhibition and surface analysis of amines on mild steel in chloride medium", Chem. Pap., Institute of Chemistry, Dec. 2016 (9 pages).

Yadav, M., et al., "Corrosion Inhibition of Tubing Steel during Acidization of Oil and Gas Wells", Journal of Petroleum Engineering, Hindawi Publishing Corporation, vol. 2013, Article ID 354630, pp. 1-9 (9 pages).

Zhang, Yanbing, et al., "Preparation of Lipophilic Graphene Oxide Derivates via a Concise Route and its Mechanical Reinforcement in Thermoplastic Polyurethane", Composites Science and Technology, doi: 10.1016/j.compscitech.2016.07.027, 2016 (31 pages).

Zhu, Chao, et al., "Facile fabrication of long-chain alkyl functionalized ultrafine reduced graphene oxide nanocomposits for enhanced tribological performance", RSC Advances, Royal Society of Chemistry, vol. 9, 2019, pp. 7324-7333 (10 pages).

Mandal, Pramod, et al., "Investigation of the effects of electrophoretic deposition parameters on 304SS steel coated with graphene oxide for PEMFC appliction", Materials Today: Proceedings, ScienceDirect, Elsevier Ltd., 2020 (6 pages).

(56) References Cited

OTHER PUBLICATIONS

Prakabar, S.J. Richard, et al., "Graphene oxide as a corrosion inhibitor for the aluminum current collector in lithium ion batteries", Carbon, SciVerse ScienceDirect, Elsevier Ltd., vol. 52, 2013, pp. 128-136 (9 pages).

Han, Jong-Seok, et al., "Synthesis, Dispersion, and Tribological Performance of Alkyl-functionalized Graphene Oxide as an Oil Lubricant Additive and Synergistic Interaction with IF-WS2", Bulletin of the Korean Checmical Society, Korean Chemical Society, vol. 41, 2020, pp. 518-529 (12 pages).

* cited by examiner

GRAPHENE BASED MATERIAL FOR CORROSION INHIBITION

BACKGROUND

In the oil and gas industry, stimulation procedures are often carried out to enhance hydrocarbon recovery from a subterranean reservoir. While acidizing, a common stimulation procedure that includes the injection of hot concentrated acid into a subterranean formation, often provides a significant boost in well productivity, it can also lead to the corrosion of downhole steel equipment. Thus, corrosion inhibitors are commonly added to acidizing fluids to in order to protect such steel surfaces.

Typically, corrosion inhibitors are adsorbed to the steel surface, forming a protective layer against corrosive acid. Common corrosion inhibitors include functionalities such as carbonyls, aromatic aldehydes, acetylenic alcohols, and nitrogen-containing heterocycles, and are expensive and toxic to people and the environment. Accordingly, there exists a need for nontoxic, inexpensive corrosion inhibitors that are effective at low concentrations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method that includes preparing an alkyl-modified graphene oxide, injecting the modified graphene oxide into a well, and inhibiting acid-induced corrosion of a steel surface in the well with the modified graphene oxide.

In another aspect, embodiments disclosed herein relate to a composition including an alkyl-modified graphene oxide having one or more alkyl functional groups covalently bonded to a graphene core through an oxygen-containing linking group.

In yet another aspect, embodiments disclosed herein relate to a method of preparing modified graphene oxide that includes mixing graphite powder with an oxidant to provide a mixture, adding the mixture to an acid solution including $H_2SO_4$, $H_3PO_4$, or a combination thereof to provide graphene oxide, and reacting the graphene oxide with an alkyl halide by nucleophilic substitution to provide the alkyl-modified graphene oxide.

Other aspects and advantages of the claimed subject matter will be apparent from the following description and the appended claims.

DETAILED DESCRIPTION

Figure 1:
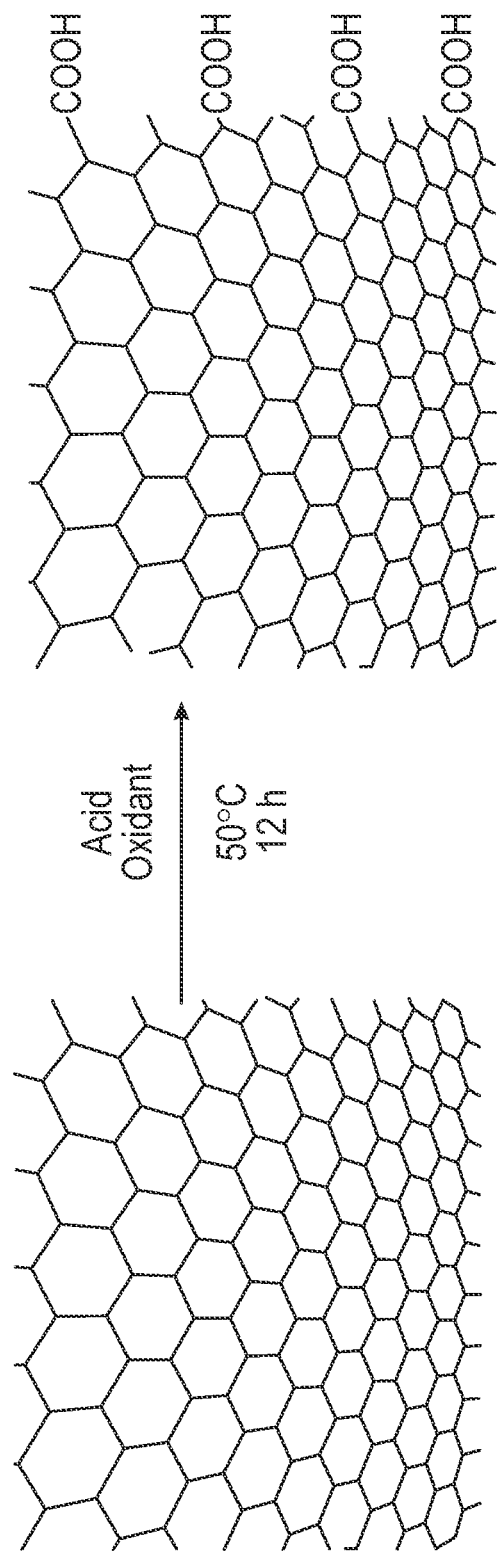
FIG. 1 is a reaction scheme in accordance with one or more embodiments of the present disclosure.

The present disclosure generally relates to compositions and methods for corrosion inhibition of steel surfaces. Such compositions and methods may be used downhole to protect steel equipment from corrosives, such as, for example, concentrated acid. One or more embodiments relate to corrosion inhibition of acidizing fluid. Disclosed compositions include graphene oxide modified with one or more alkyl functional groups. Such alkyl-modified graphene oxide may be prepared according to nontoxic wet chemistry techniques and the resultant modified graphene oxide may be included in injection fluids to inhibit corrosion of steel surfaces downhole.

Modified Graphene Oxide Composition

In one aspect, embodiments disclosed herein relate to a composition for corrosion inhibition of carbon steel. The composition may include graphene oxide modified with one or more alkyl functional groups. Such graphene oxide may be referred to interchangeably as "modified graphene oxide" and "alkyl-modified graphene oxide" herein.

In one or more embodiments, the composition includes modified graphene oxide. The modified graphene oxide may be modified to include one or more alkyl functional groups. Such alkyl functional groups may be covalently bonded to a graphene through an oxygen-containing linking group. In one or more embodiments, the alkyl functional group has from 6 to 20 carbon atoms. The alkyl functional group may have an even number of carbon atoms. Suitable alkyl functional groups include, but are not limited to, hexane, octane, decane, dodecane, tetradecane, hexadecane, and octadecane. In particular embodiments, the alkyl functional group is hexane, dodecane, or octadecane.

As described above, the modified graphene oxide may have an oxygen-containing linking group. Graphene oxide is a unique material that has a single monomolecular layer of graphite with various oxygen-containing functionalities such as epoxide, carbonyl, carboxyl, and hydroxyl. As such, the oxygen containing functionalities may be derived from any one of an epoxide, a carbonyl, a carboxyl, and a hydroxyl group. In one or more particular embodiments, the oxygen-containing linking group is derived from a carboxyl group, and thus, has the formula —$CO_2$—, where graphene is bonded to the carbonyl carbon and the alkyl functional group is bonded to the nucleophilic oxygen.

In one or more embodiments, the modified graphene oxide includes one or more alkyl functional groups in a ratio ranging from 1:4 to 4:1, graphene oxide to alkyl functional group. For example, one or more alkyl functional groups may be included in the modified graphene oxide in a ratio ranging from a lower limit of one of 1:4, 1:3, 1:2, and 1:1 graphene oxide to alkyl functional group to an upper limit of one of 1:1, 2:1, 3:1, and 4:1, graphene oxide to alkyl functional group. In particular embodiments, the modified graphene oxide includes graphene oxide and one or more alkyl functional group in a ratio of about 1:1.

In one or more embodiments, the modified graphene oxide is a graphene nanosheet. A "nanosheet" is an individual molecule of modified graphene oxide. The nanosheet has a length, a width, and a height. The 'nano' dimension is measured along the height of the molecule from a front face to a back face. The height of the molecule ranges from about 7 to 30 nanometers (nm), such as from 8 to 30 nm, 9 to 28 nm, 10 to 26 nm, and 12 to 24 nm. The length of the nanosheet is in the range of about 2 to 20 micrometers (μm), such as 3 to 20 μm, 4 to 20 μm, or 5 to 20 μm. The width of the nanosheet is in the range of about 2 to 20 micrometers (μm), such as 3 to 20 μm, 4 to 20 μm, or 5 to 20 μm. The shape of the nanosheet is not particularly limited and may include an overall rectangle shape, a square shape, or other geometric shape. This 2 to 20 μm length and width range of nanosheet is considered longer (or larger) than nanosheets of a smaller size range, even though a smaller size range may overlap a portion of the 2 to 20 μm range.

As previously described, modified graphene oxide according to the present disclosure may be used as a corrosion inhibitor. In one or more embodiments, the modified graphene oxide is used to inhibit the corrosion of steel surfaces of a well. The steel surfaces may be downhole. In one or more embodiments, the steel surfaces may be exposed to acidizing fluids. As such, the modified graphene oxide of one or more embodiments is used as a corrosion inhibitor against hot concentrated acid on carbon steel.

In some embodiments, the modified graphene oxide is included in an acidizing fluid. In such embodiments, the acidizing fluid includes the modified graphene oxide in a concentration ranging from 5 ppm to 100 ppm. For example, the acidizing fluid may include modified graphene oxide in a concentration ranging from a lower limit of one of 5, 10, 15, 20, and 25 ppm to an upper limit of one of 50, 60, 70, 80, 90, and 100 ppm, where any lower limit may be paired with any mathematically compatible upper limit. In particular embodiments, the acidizing fluid includes about 10 ppm of modified graphene oxide.

In other embodiments, the modified graphene oxide is applied to the carbon steel prior to injection of an acidizing fluid. In such embodiments, the modified graphene oxide may be included in an injection fluid and injected into a well such that it comes into contact with steel surfaces downhole. Any injection fluid known in the art may be used, provided it does not interact with, or degrade, the modified graphene oxide. The injection fluid may include the modified graphene oxide in a concentration ranging from 5 ppm to 100 ppm. For example, in one or more embodiments, the injection fluid includes modified graphene oxide in a concentration ranging from a lower limit of one of 5, 10, 15, 20, and 25 ppm to an upper limit of one of 50, 60, 70, 80, 90, and 100 ppm, where any lower limit may be paired with any mathematically compatible upper limit. In particular embodiments, the injection fluid includes about 10 ppm of modified graphene oxide.

After being injected into the well, the modified graphene oxide may come into contact with steel surfaces. Upon contact, the modified graphene oxide may adsorb to the steel surface via the interaction between the electron density on the modified graphene oxide and the metal atoms present in the steel. Such interaction may enable the modified graphene oxide to remain on the steel surface and inhibit corrosion due to strong acids present in acidizing fluid that may be injected at a later time.

In one or more embodiments, the modified graphene oxide may exhibit an improved corrosion rate as compared to graphene oxide. The corrosion rate may be determined by weight loss tests carried out according to ASTM G1-03. For instance, an initial weight of a sample of carbon steel may be collected. Then, the sample may be immersed in a solution including modified graphene oxide. After being immersed for a period of time, the carbon steel sample may be removed from the solution and a final weight may be collected. The corrosion rate may then be calculated based on the weight loss of the sample of carbon steel, according to Equation 1, below:

$$\text{Corrosion rate (mm/year)} = \frac{W \times 8.76 \times 10^4}{A \times T \times D} \quad (1)$$

where W is the weight loss in grams (g), A is the total exposed surface area in square centimeters (cm$^2$), T is the immersion time in hours (h), and C is the coupon density in grams per cubic centimeter (g/cm$^3$). In one or more embodiments, multiple samples of carbon steel may be used to determine an average weight loss, and in turn, an average corrosion rate.

As measured according to the above procedure, modified graphene oxide in accordance with the present disclosure may have a corrosion rate ranging from 0.30 to 0.55 mm/yr (millimeters per year). For example, in one or more embodiments, the modified graphene oxide has a corrosion rate ranging from a lower limit of one of 0.30, 0.32, 0.35, 0.38, and 0.40 mm/yr to an upper limit of one of 0.42, 0.45, 0.48, 0.50, and 0.55 mm/yr, where any lower limit may be paired with any mathematically compatible upper limit. In comparison, graphene oxide may have a corrosion rate of about 3.0.

In one or more embodiments, the modified graphene oxide may exhibit an improved corrosion inhibition efficiency as compared to graphene oxide. The corrosion inhibition efficiency may be calculated using the corrosion rates of a blank sample and an inhibited sample according to Equation 2, below:

$$\% \ IE_{Wt\,Loss} = \frac{CR_o - CR_I}{CR_o} \times 100 \quad (2)$$

where $CR_o$ is the corrosion rate of a blank solution, i.e., a solution including graphene oxide and $CR_I$ is the corrosion rate of an inhibited solution, i.e., a solution including modified graphene oxide of one or more embodiments.

Whereas a blank solution including graphene oxide may have a corrosion inhibition efficient of about 25%, an inhibited solution including modified graphene oxide may have a corrosion efficiency ranging from 85 to 95% against hot concentrated acid. For example, when adsorbed to a steel surface, modified graphene oxide of one or more embodiments may inhibit corrosion with an efficiency ranging from a lower limit of one of 85, 86, 87, 88, 89, and 90% to an upper limit of one of 90, 91, 92, 93, 94, and 95%, where any lower limit may be paired with any mathematically compatible upper limit.

Method of Preparing Modified Graphene Oxide

In another aspect, embodiments disclosed herein relate to a method of preparing modified graphene oxide for corrosion inhibition of carbon steel. The modified graphene oxide is as previously described. Methods of one or more embodiments include using wet chemistry techniques to provide graphene oxide with one or more alkyl functional group. Further, the method may be safer than conventional methods of preparing graphene oxide, such as, for example, Hummer's method, due to the use of nontoxic reagents.

Initially, graphene oxide may be prepared from graphite. In one or more embodiments, graphite powder may be mixed with an oxidant in an acidic solution at a low temperature. The graphite powder may be waste graphite powder. Any oxidant known in the art may be mixed with the graphite powder such as, for example, potassium permanganate ($KMnO_4$). The graphite powder and oxidant may be added in a mole ratio of from 1:1 to 3:1, graphite to oxidant.

As described above, the graphite powder and oxidant may be mixed in an acidic solution. The acidic solution may include one or more organic or inorganic acids. In one or more embodiments, the acidic solution includes one or more inorganic acids. Suitable inorganic acids include, but are not limited to, sulfuric acid ($H_2SO_4$), phosphoric acid ($H_3PO_4$), nitric acid ($HNO_3$), and hydrochloric acid (HCl). In one or more embodiments, the acidic solution includes two of the previously listed inorganic acids. In such embodiments, the acidic solution may include a first acid in an amount of 90 to 99.5 vol % and a second acid in an amount of 0.5 to 10 vol %, based on the total volume of the acidic solution. For example, a first acid may be included in the acidic solution in an amount ranging from a lower limit of one of 90, 91, 92, 93, 94, and 95 vol % to an upper limit of one of 95, 96, 97, 98, 99, 99.5 and 99.9 vol %, where any lower limit may be paired with any mathematically compatible upper limit. Likewise, a second acid may be included in the acidic solution in an amount ranging from a lower limit of one of 0.1, 0.5, 1, 2, 3, 4, and 5 vol % to an upper limit of one of 5, 6, 7, 8, 9, and 10 vol %, where any lower limit may be paired with any mathematically compatible upper limit. In particular embodiments, the first acid is $H_2SO_4$, and the second acid is $H_3PO_4$.

In one or more embodiments, the graphite powder and oxidant are added to the acidic solution at low temperature. Any temperature below ambient may be used, provided that it is sufficient to inhibit any reaction from taking place during addition of the graphite powder and oxidant. For example, the acidic solution may be held at a low temperature of about $-10°$ C. to about $20°$ C., during the addition of the graphite powder and the oxidant.

After the graphite powder and oxidant are added to the acidic solution, the reaction mixture may be heated to an elevated temperature and stirred for a period of time. In one or more embodiments, the reaction mixture may be heated to an elevated temperature sufficient to induce oxidation of the graphite powder with the oxidant. For example, the reaction may be heated to an elevated temperature of from about 40 to about $80°$ C. The reaction may be maintained at such elevated temperature, with stirring, for a period of time. The period of time may depend on various factors including the particular oxidant, the elevated temperature, and the mole ratio of oxidant to graphite powder used. In one or more embodiments, the reaction is stirred at an elevated temperature for a period of time ranging from 6 to 24 hours.

Subsequently, the reaction may be allowed to cool to ambient temperature, and then quenched by exposure to an aqueous solution. The aqueous solution includes water. The water may be any suitable type of water known in the art, such as, for example, deionized water, distilled water, or tap water. In one or more embodiments, the aqueous solution includes a peroxide oxidizing agent such as, for example, hydrogen peroxide. Suitable peroxides may be added as a peroxide solution in water and may have a concentration ranging from 20 to 50 wt %, based on the total weight of the peroxide solution. A peroxide may be included in the aqueous solution in an amount ranging 0.25 to 2.0 vol %, based on the total volume of the aqueous solution.

After quenching, the crude reaction product, i.e., graphene oxide, may be purified according to techniques known in the art. For example, the crude reaction product may undergo a series of steps including extracting, washing, and drying steps. In one or more embodiments, the crude reaction product may be washed with water, acid, and/or brine to remove any unreacted reagents such as acid or metal ions. After such washes, the crude reaction product may be dissolved in water, concentrated, and dried to provide purified graphene oxide. The reaction product may be concentrated according to methods known in the art, such as, for example, centrifugation.

The purified graphene oxide may include one or more oxygen-containing functionalities such as, for example, epoxide, carbonyl, carboxyl, and hydroxyl. In one or more embodiments, the purified graphene oxide includes carboxyl functionality. Carboxyl groups on the graphene oxide may react with an alkyl halide via nucleophilic substitution to provide alkyl-modified graphene oxide. Such process is described in detail below.

In one or more embodiments, the purified graphene oxide is heated to an elevated temperature at reduced pressure for an amount of time, then cooled to ambient temperature and maintained at the reduced pressure for an additional amount of time. The reduced pressure may be achieved using any method known in the art. In one or more embodiments, the purified graphene oxide is exposed to a vacuum in order to achieve a reduced pressure The purified graphene oxide may be heated to an elevated temperature sufficient to remove any excess aqueous fluid or acid from the purified graphene oxide. Any elevated temperature sufficient to dry the graphene oxide may be used, provided that it does not degrade the structure of the purified graphene oxide. Suitable elevated temperatures may range from about 120 to about $200°$ C.

Then, a solvent may be added to the purified graphene oxide to reach a concentration of graphene oxide in the solvent of about 0.25 to 0.75 M. In particular embodiments, the concentration of graphene oxide in the solvent is about 0.5 M. Any solvent known in the art to suspend graphene oxide may be used. Exemplary solvents include tetrahydrofuran (THF), γ-valerolactone (GVL), methyl isobutyl ketone (MIBK), and 2-sec-butylphenol (SBP), methanol, and ethanol. In particular embodiments, THF is added to the purified graphene oxide.

Once the purified graphene oxide is suspended in the solvent, a reductant may be added. Suitable reductants include naphthalene salts such as sodium naphthalene, lithium naphthalene, and potassium naphthalene. In one or more particular embodiments, the reductant is sodium naphthalene.

Then, one or more alkyl halide may be added to the reaction. Addition of an alkyl halide may be performed dropwise. The alkyl halide may be added in a mole ratio ranging from 1:4 to 4:1, graphene oxide to alkyl halide. For example, one or more alkyl halides may be added in a mole ratio ranging from a lower limit of one of 1:4, 1:3, 1:2, and 1:1 graphene oxide to alkyl halide to an upper limit of one of 1:1, 2:1, 3:1, and 4:1, graphene oxide to alkyl halide. In particular embodiments, the alkyl halide is added in about a 1:1 mole ratio, based on the moles of graphene oxide.

In one or more embodiments, the one or more alkyl halides may have a number of carbon atoms ranging from 6 to 20. For example, suitable alkyl halides may include an alkyl group such as hexane, octane, decane, dodecane, tetradecane, hexadecane, and octadecane. In some embodiments, the one or more alkyl halide has an even number of carbon atoms. In particular embodiments, the alkyl halide includes a hexane, a dodecane, or an octadecane alkyl group. The one or more alkyl halide may be an alkyl chloride, an alkyl iodide, or an alkyl bromide. In particular embodiments, the one or more alkyl halide is an alkyl bromide.

In one or more embodiments, after the addition of one or more alkyl halide, the reaction is stirred at ambient for an amount of time. The amount of time may range from 30 minutes to two hours. Then, nitrogen gas may be bubbled through the reaction for 30 minutes to two hours, while stirring and ambient temperature are maintained. After bubbling nitrogen gas through the reaction mixture, the reaction may be stirred at ambient conditions for an amount of time sufficient to provide the alkyl-modified graphene oxide. A suitable amount of time may range from 12 to 36 hours, depending on other reaction conditions.

The crude alkyl-modified graphene oxide may then be purified according to techniques known in the art, as described above. In one or more embodiments, the alkyl-modified graphene oxide is concentrated and then washed with an alcohol to remove any residual reactants. Subsequently, the alkyl-modified graphene oxide may be dried under reduced pressure at an elevated temperature to yield the purified alkyl-modified graphene oxide. The reduced pressure may be achieved using a vacuum and the elevated temperature may be sufficient to remove any solvents used for the reaction or purification, provided that it does not affect the modified graphene oxide. Suitable temperatures may range from 60 to 100° C., depending on the structure of the modified graphene oxide.

As described above, once purified, the modified graphene oxide may be included in an acidizing fluid or other injection fluid for use as a corrosion inhibitor in a well. As previously described, the modified graphene oxide may be included in an acidizing or other injection fluid in a concentration ranging from about 5 ppm to about 100 ppm. In embodiments in which the modified graphene oxide is included in an acidizing fluid, it may be injected into the well at the same time as the strong acids for which it acts as a corrosion inhibitor. After injection of the acidizing fluid, the well may be shut in for a period of time.

Alternatively, in embodiments in which the modified graphene oxide is included in an injection fluid other than an acidizing fluid, the modified graphene oxide may be injected some time before the strong acids for which it acts as a corrosion inhibitor. In such embodiments, the well may be shut in after injection of the modified graphene oxide and before injection of the acidizing fluid. After a sufficient shut-in time, the well may be reopened, and an acidizing fluid injected. Then, the well may be shut in for a second period of time.

EXAMPLES

Waste graphite powder was obtained from post-industrial sources. Potassium permanganate ($KMnO_4$), sulfuric acid ($H_2SO_4$), phosphoric acid ($H_3PO_4$), hydrochloric acid (HCl) ethanol, hydrogen peroxide ($H_2O_2$), 1-bromohexane, 1-bromododecane, and 1-bromooctadecane were obtained from Sigma Aldrich.

Graphene Oxide Synthesis

A reaction scheme in accordance with the graphene oxide (GO) synthesis described below is shown in FIG. 1. The GO was prepared by wet chemical procedure, using waste graphite powder. Graphite powder (3 g) and $KMnO_4$ (18 g) were mixed and then slowly added to an ice-cold mixture of 360 ml $H_2SO_4$ (96%) and 40 ml $H_3PO_4$ while stirring. The mixture was heated for 12 hours at 50° C. with stirring, then allowed to cool at ambient temperature overnight before being poured into a 400 mL deionized water ice with 3 mL $H_2O_2$ (30%) added. The resulting product was allowed to settle overnight before the supernatant was removed. The resulting product was then washed many times with water to eliminate any remaining acid. The resulting product was then washed three times with 10% HCl and distilled water to remove unreacted metal ions, and the final product was suspended in deionized water, where the GO suspended, and unreacted graphite settled. The suspended GO was decanted, centrifuged for 1 hour at 1000 rpm, and dried.

Modified GO Synthesis

Figure 2:
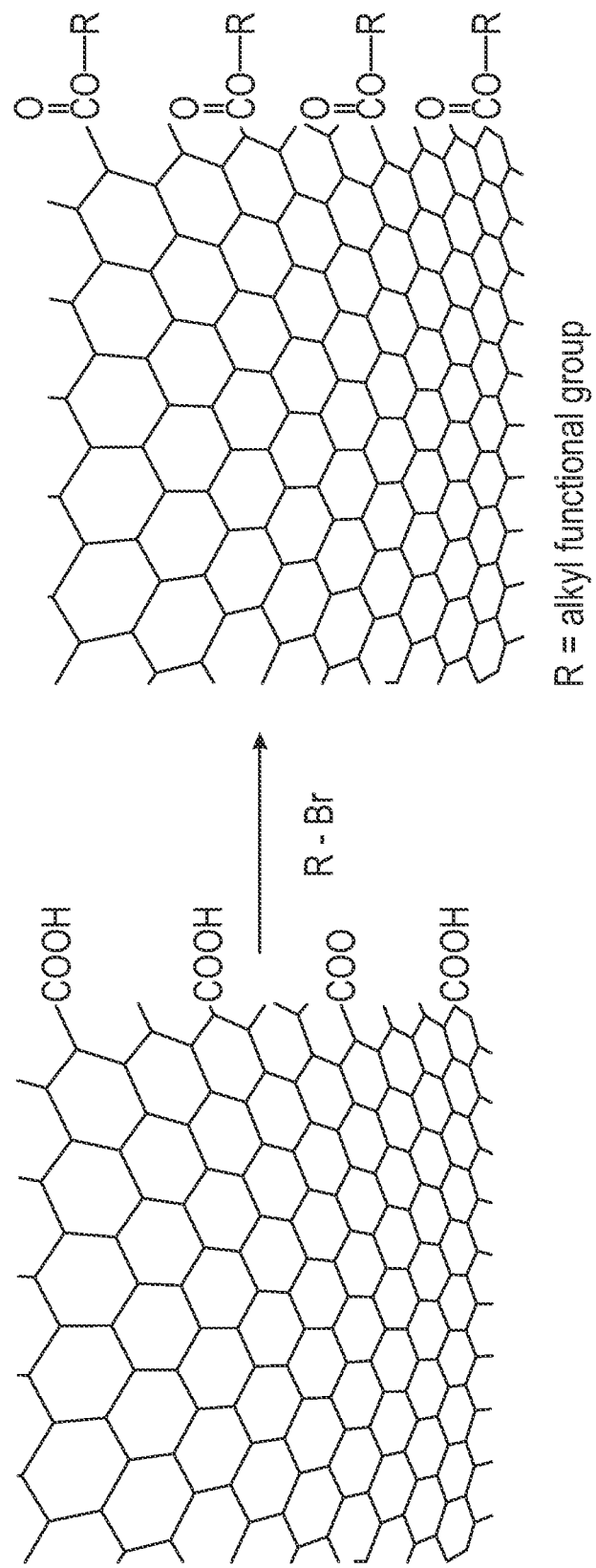
FIG. 2 is a reaction scheme in accordance with one or more embodiments of the present disclosure.

Graphene oxide prepared according to the above procedure was modified with three different alkyl bromides: 1-bromohexane, 1-bromododecane, and 1-bromooctadecane. The synthesis of exemplary modified graphene oxides is provided below. A generic reaction scheme for the synthesis of modified graphene oxide according to the below procedure is shown in FIG. 2. In FIG. 2, R represents the alkyl functional group included on the modified graphene oxide. In the present examples, R may be hexane, dodecane, or octadecane, based on the alkyl bromide used.

GO (0.75 g, 62.5 mmol carbon) was placed in a flask, heated at 150° C. for 1 h under vacuum, and then kept under vacuum for 5 h at room temperature. THF (124 mL) was added such that the concentration of GO in tetrahydrofuran (THF) was adjusted to 0.5 M. Three drops of sodium naphthalene were added. Then, an alkyl halide was slowly added to the suspension and the reaction was stirred for 1 h at room temperature. $N_2$ (99.9%) was bubbled into the solution for 1 h, then stirred for 24 h. The obtained modified GO was separated by centrifuge, and subsequently washed with ethanol to remove any residuals. The modified GO was obtained as a dark powder. It was then dried under vacuum at 80° C.

Example 1

Example 1 was prepared according to the above procedure with 1-bromohexane as the alkyl halide. The mole ratio of graphene oxide to 1-bromohexane was 4:1.

Example 2

Example 2 was prepared according to the above procedure with 1-bromohexane as the alkyl halide. The mole ratio of graphene oxide to 1-bromohexane was 1:1.

Example 3

Example 3 was prepared according to the above procedure with 1-bromohexane as the alkyl halide. The mole ratio of graphene oxide to 1-bromohexane was 1:4.

Example 4

Example 4 was prepared according to the above procedure with 1-bromododecane as the alkyl halide. The mole ratio of graphene oxide to 1-bromododecane was 4:1.

Example 5

Example 5 was prepared according to the above procedure with 1-bromododecane as the alkyl halide. The mole ratio of graphene oxide to 1-bromododecane was 1:1.

Example 6

Example 6 was prepared according to the above procedure with 1-bromododecane as the alkyl halide. The mole ratio of graphene oxide to 1-bromododecane was 1:4.

Example 7

Example 7 was prepared according to the above procedure with 1-bromooctadecane as the alkyl halide. The mole ratio of graphene oxide to 1-bromooctadecane was 4:1.

Example 8

Example 8 was prepared according to the above procedure with 1-bromooctadecane as the alkyl halide. The mole ratio of graphene oxide to 1-bromooctadecane was 1:1.

Example 9

Example 9 was prepared according to the above procedure with 1-bromooctadecane as the alkyl halide. The mole ratio of graphene oxide to 1-bromooctadecane was 1:4.

Weight Loss Measurement Experiment to Estimate Corrosion Rate

The ASTM G1-03 methodology was used for the weight loss experiment. Pre-weighed carbon steel specimens were immersed entirely in duplicates of three in 100 ml of acidic test solutions housed in a 250 ml glass container held at ambient temperature (25±1° C.) for 24 hours. If included in the same, graphene oxide was present in a concentration of 10 ppm. Each test sample was then removed, carefully cleansed, rinsed with distilled water and acetone, dried, and weighed. The difference in weight before and after the specimens were immersed was utilized to calculate the weight loss and the average weight loss was used to compute the corrosion rate.

Table 1 shows the weight loss results for test solutions including no graphene oxide, conventional graphene oxide, and modified graphene oxides Examples 1-9. The corrosion rate of each test solution was calculated according to equation (I), below:

$$\text{Corrosion rate (mm/year)} = \frac{W \times 8.76 \times 10^4}{A \times T \times D} \quad (I)$$

where W denotes average weight loss in grams (g), A is the total exposed surface area in square centimeters (cm$^2$), T is the immersion time in hours (hr), and D is the coupon density in grams per cubic meter (g/cm$^3$).

The % inhibition efficiency (% IE) was calculated using equation (II), below:

$$\% \, IE_{Wt\,Loss} = \frac{CR_o - CR_I}{CR_o} \times 100 \quad (II)$$

where $CR_o$ and $CR_I$ are the corrosion rates for the blank and inhibited test solutions, respectively.

TABLE 1

Weight loss measurement results

| Corrosion inhibitor | Weight Loss (g) | Corrosion Rate | % IE |
|---|---|---|---|
| None | 0.249 | 3.8346 | — |
| GO | 0.192 | 2.9 | 24.48 |
| Example 1 | 0.034 | 0.5236 | 86.35 |
| Example 2 | 0.033 | 0.5082 | 86.75 |
| Example 3 | 0.028 | 0.4312 | 88.76 |
| Example 4 | 0.025 | 0.385 | 89.96 |
| Example 5 | 0.023 | 0.3542 | 90.76 |
| Example 6 | 0.024 | 0.3696 | 90.36 |
| Example 7 | 0.023 | 0.3542 | 90.76 |
| Example 8 | 0.022 | 0.3388 | 91.16 |
| Example 9 | 0.024 | 0.3696 | 90.36 |

As shown in Table 1, the solution including conventional GO as a corrosion inhibitor corroded at a somewhat slower rate than the blank solution (i.e., no corrosion inhibitor); however, as the concentration of GO increases, this rate decreases, reaching a high corrosion rate at 10 ppm concentration with an efficiency of 25% (Table 1). Exfoliated graphene oxide particles have a tendency to stay together by π-π stacking, generating large graphite oxide particles, which may result in the poor corrosion inhibition performance demonstrated herein. The grafting of alkanes on the GO surface may stabilize the GO particles, improving GO performance as indicated by test solutions including Examples 1-9 which have a lower rate of corrosion than conventional GO (Table 1). The corrosion rate values for solutions including Examples 1-9 were significantly lower than the blank and conventional GO inhibited solutions. This decrease in corrosion rate became more significant as the length of the alkane is increases, as seen in comparing Examples 1, 4, and 7. Notably, the mole ratio of GO to alkane of 1:1 achieved the highest performance inhibition efficiency, as shown by Examples 2, 5, and 8.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A composition comprising:
an injection fluid; and
an alkyl-modified graphene oxide comprising a one or more alkyl functional group covalently bonded to a graphene core through an oxygen-containing linking group,
wherein the one or more alkyl functional groups is selected from the group consisting of dodecane and octadecane,
wherein the alkyl-modified graphene oxide has a corrosion inhibition efficiency of carbon steel ranging from 89 to 95%, and
the alkyl-modified graphene oxide is included in the injection fluid in a concentration ranging from about 5 ppm to 90 ppm.

2. The composition of claim 1, wherein the oxygen-containing linking group is derived from an oxygen-containing functionality selected from the group consisting of an epoxide, a carbonyl, a carboxyl, and a hydroxyl.

3. The composition of claim 2, wherein the oxygen-containing linking group is derived from a carboxyl group.

4. The composition of claim 1, wherein the one or more alkyl functional group is present in a mole ratio ranging from 4:1 to 1:4 of alkyl functional group to graphene oxide.

5. The composition of claim 4, wherein the one or more alkyl functional group is present in a mole ratio of about 1:1 of alkyl functional group to graphene oxide.

* * * * *